Y2587 OR 3,790,754

United State

Black et al.

[11] 3,790,754

[45] Feb. 5, 1974

[54] SECURITY ACCESS MEDIUM

[75] Inventors: Robert Black, Kenley; David Provan, Mitcham, Surrey; Christopher Rainey, Croydon, all of England

[73] Assignee: Burroughs Machines Limited, Detroit, Mich.

[22] Filed: Aug. 4, 1972

[21] Appl. No.: 278,070

[52] U.S. Cl. ...................... 235/61.7 B, 235/61.12 M

[51] Int. Cl. ......................... G06k 5/00, G06k 19/06

[58] Field of Search 235/61.7 B, 61.12 N, 61.12 M; 340/149 A, 149 R, 174.1 R, 174.1 H

[56] References Cited

UNITED STATES PATENTS 3,697,729 10/1972 Edwards et al. ................ 235/61.7 B

*Primary Examiner*—Daryl W. Cook

*Attorney, Agent, or Firm*—Lynn L. Augspurger; Edward G. Fiorito; Paul W. Fish

[57] ABSTRACT

Disclosed is a security access medium and a security system utilizing the medium which is adapted to prevent fraudulent reproduction of the medium bearing member. Within the system the data representation has a predetermined relationship with a signature "developed" from the medium. When the medium is not in the system the signature is latent and not dectaotable. A plurality of substances capable of bearing records are incorporated in the medium, as a plurality of paramagnetic materials having different coercivity, to permit "development" of a secure signature.

42 Claims, 3 Drawing Figures

SECURITY ACCESS MEDIUM

This invention relates to record mediums which are capable of bearing authenticity representations, or signatures, and are adapted to prevent fraudulent reproduction. Such mediums are susceptible to many uses, such as credit cards, entry passes, coded documents, records and identification media.

Secure systems have been developed using a plurality of codes which are unscrambled and decoded. Variable techniques have been used to hide the codes on the documents bearing the hidden code or signature, including infrared-readable-only inks, chemically developable inks, and one or more magnetic layers bearing the hidden signature or information. Examples of the latter include U.K. Specifications Nos. 1,211,502 and 1,097,221. Burroughs Corporation French Patent No. 7032315 discloses a related development. Devices which use "authenticity codes" are illustrated by this French Patent and British Specification No. 1,166,085.

Media using chemical or magnetic stores are susceptible to "skimming"; i.e., the transfer of stored information to other duplicate information bearing media, decoding and fraudulent reproduction by other means. This has inhibited an international system of banking dependant upon the use of known media, and other developments where the information content and identify of the information and user is critical.

The object of the invention is to provide a medium and method of manufacture and use incapable of being decoded or reproduced by undesirable elements.

With this object in view there is provided a substrate incorporating a substance capable of storing information when subjected to a signature identification signal and having a latent state and an active information rendering state, the latent state having no relevant signature identification information but susceptible to change into the active state when introduced into a secure system. The signature identification signal is generated with the secure system and is susceptible to control by appropriate logic.

An example of the invention is illustrated in the drawings in which.

Figure 1:
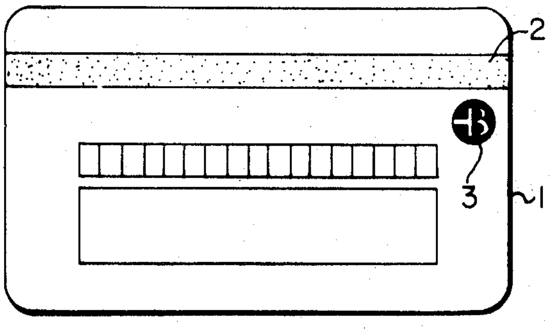
FIG. 1 is a plan view of a credit card using the access medium.

In the drawings, the substrate 1 may bear visual indicia 3 and another information bearing media, such as the paramagnetic data track 2.

Preferably the secure substance is hidden in a location where its presence is not readily detectable such as the location of track 4.

In the embodiment of the invention illustrated in the drawings the secure substance has a plural character, as illustrated by the characters A and B. The location and presence of a part of the plural character substance is a variable which is controlled during the manufacturing process. As illustrated, the location is along a track which can be read by a reading device which may also be capable of reading the information on the data track and/or the visual information on the surface of the substrate. This visual information on the substrate may be embossed or printed. The information thus represented, either on the data track 2 or the visual indicia 3 or both, in the example of a credit card, may include account numbers, checking and/or credit, or savings, the Bank's transit and routing number, a code related to the secure property, the last date of use, the number of uses permitted during a period, the number of uses which have occurred during the current period, and the expiration date of the card.

The preferred form of the secure substance is a plurality of paramagnetic materials having measurably different levels of coercivity. Two are illustrated in the location of the track 4. In the track 4, A represents a material of "hard" coercivity and B represents a material of "soft" coercivity. Examples of "hard" material include barium ferrite, "Alnico" (registered trademark) powder, nickel cobalt, and others of similar materials having high values of remanence and coercivity. Examples of "soft" coercivity which may be used are finely divided gamma ferric oxide, hydrogen reduced iron, electrolytic iron, "carbonyl" iron prepared by thermal decomposition of iron pentacarbonyl, and high permeability alloys and magnetic oxides of iron, and others of similar low values of remanence and coercivity. The average particle diameter is 3 microns and within a range of 0.5 to 8.0 microns. This material is preferably supported in a binder before application to the substrate, but in some instances it may be desired to utilize the substrate itself as the binder.

A specific binder may be of the fluid type. One which has given excellent results has the following composition by volume:

Oleic acid — 25%
Lauric acid — 5%
Magnetic material — 70%

After blending, as will be appreciated, it may or may not be desirable to have a uniform dispersion. If desired, this embodiment would have been subjected to ultrasonic vibration at a frequency of about 400 Kilohertz. When impact application is desired, it may be useful to have a different support for the magnetic material. In such a case, excellent results may be had with a waxy base made of the following ingredients: petrolatum (m.p. 52° and 63° C. viscosity at 27° C. between 2,500 and 4,500 Saybolt Universal Seconds at a rate of shear of 1,200 reciprocal seconds); paraffin wax (m.p. 52° and 55° C.); Esparto grass wax (m.p. 78° C.); beeswax (Specific gravity 0.95 to 0.97 at 15.5° C. and m.p. between 62° and 65° C.); Ouricury wax (m.p. between 79° and 84° C.); and naphthenic petroleum oil having a flash point (open cup tester) of 177° C. minimum, and a fire point (open cup tester) of 204° C. minimum, a pour point of −23° C. and a viscosity at 38° C. of (Saybolt) 300 to 325. The units by weight which are preferred are respectively in the same order: 12.0 units; 3.2 units; 6.7 units; 1.8 units; 5.3 units; 1.1 units; totaling 30.1 units of weight.

The amount of material of each character, its location, dimensions and coercivity are measurable variables, and the application of each material may be predetermined in a variable manner, as random application or predetermined application in accordance with a code system or system of random numbers. we prefer a random application of a random amount which is susceptible upon application of a signature identification signal to be read to determine a measurable quantity which can convey information either directly or upon comparison with other information.

Figure 2:
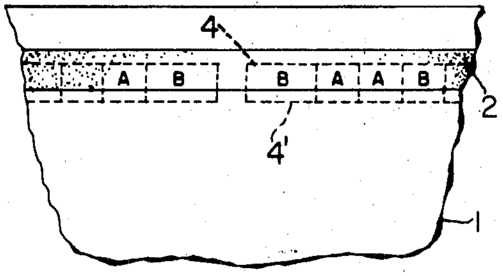
FIG. 2 is a cutaway plan view of the card of FIG. 1, showing the position of the secure substance in phantom.

For example, with reference to the drawings, FIG. 2, shows a random application of random amounts of magnetic material in a track 4. The relative position of the variable amounts of magnetic material A and B may be determined as the result of printing from a rotary ink bearing member in two passes. Preferably, it happens that the two inks do not fill the entire track, and it also happens that they did not overlap. As it is preferred that the inks do not overlap, this may be a constant on the application which is imposed on the preferred system. The same, or a similar result would occur if the areas containing ink were deposited by impact printing in which the type font contained random "numbers" which were actuated in accordance with a random or codal sequence or wherein the application differed in placement, even though within tolerance or limits. A similar result would be obtained if the materials were randomly incorporated in the substrate during manufacture, as during mixture.

Figure 3:
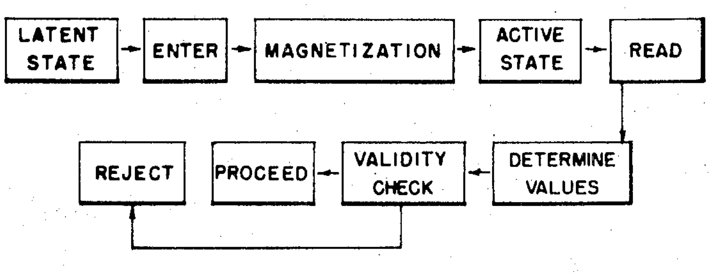
FIG. 3 is a schematic diagram of the method of using the medium.

As shown in FIG. 3, each of the two oxides A and B, being hard and soft respectively, require different ampere turns to reverse its magnetic state or field. Measurement is preferably accomplished by magnetizing the oxides from the initial standard level of the latent state to a second standard level of the active state by writing with a first polarity and first predetermined level of current. Then a value is calculated by reading what has been written and the value is entered into the system. A magnetization current of a second predetermined level is subsequently applied to enable reading of a signal at a second level and the second level signal is read and a second value determined and recorded in the system. The first and second values are compared with a record to determine whether each value is within prescribed limits of the random values and they are compared with each other. These determinations are recorded either on the data track 2 or at the store of another part of the system and compared in the logic system in which the card is used. The transport mechanism of the system is preferably designed to compensate for variations in orientation of the magnetic material.

The first writing may, for example, be accomplished by writing on an erased card with a low current of a given polarity thereby magnetizing or writing only on the "soft" ink. The soft ink is then read and its value is determined. The second writing could be with a high current of the same given polarity, and then rewriting with a low current having a polarity which is reversed from the given polarity. The rewriting would erase the "soft" ink so that subsequent reading of the card would read only the "hard" inks whose magnetic state had not been changed by the low current. The "hard" ink's value could thus be determined. Various modifications of this example will be apparent to those knowledgeable in the art, including alternating the polarity and sequence of high and low level currents and the elimination of the rewriting technique to erase the "soft" ink.

A write signal is induced in the magnetic material via a write circuit, which signal is generated by a logic algorithm as the signature identification signal. The current applied is preferably 200 mA for the high current and 50 mA for the low current.

The signal read is applied to and sent through a logic restoration circuit to the logic system of the secure system. The open circuit head voltage is within the range of 200 micro volts to 2 milli volts, peak to peak, and preferably between 300 micro volts to 1 milli volt.

After this record is made and the comparison is made, the entire card may be returned to its first standard level of magnetization, while the information derived from the card through subjecting it to a signature identification signal is retained in the system. The card then may be given to the user. In its first standard level of magnetization, the card is in its latent state. For the card to return to the active state, it must again be introduced into the system and a signature identification write signal applied to it. The subsequent reading can then be compared with the individual remembered information present upon the last reading of the card before it left the system, and the validity of the card, and any related information can be determined. The reading of the card will thus have a measurable relationship to other information on the card or in the system or to information on the card or in the system or to information which may be later entered into the system. Such later information may, in the case of a credit card, be the personal private remembered number of the customer. In the case of secret information, it may be an encripted message sent via a separate source input or further down the medium.

From period to period the manner of utilizing cogent signals may vary. Preferably the variables chosen are a subset of the following set: voltage and current; frequency of the signal; bandwidth; the nature of clipping; the coercivity of the magnetic material; the physical dimensions of the reading and writing operations, as determined by the spacing of the heads and the gaps utilized, and a numeric value, which may be coded and encripted and others of like character. An excellent, multi-facit subset to be tested is that of the variables of frequency, relative distance and position, and numeric values. Another excellent subset includes tests and comparisons for voltage, bandwidth and frequency.

It will be appreciated that even if the entire related data were successfully transferred from the data track 2, the system which is fully activated only by the security access medium, will reject the information as fraudulent or out of date or otherwise invalid because it has not correct correlation to the current state of the security access medium. In most instances when a fraudulent attempt is made to duplicate the card the information would be transferred to a "blank" card, and the card would be rejected due to the lack of the security access medium. However, even with the presence of a related medium, even another from the same manufacturing process, the variables suggested preclude a correlation to the data on the card and other information in the system and entered into the system upon presence of the card having the medium (as a password or cryptographic code) and the card would be rejected.

Again referring to FIGS. 2 and 3, in the preferred embodiment of the invention the random application of random amounts of magnetic material in track 4 is accomplished by providing the two inks having hard and soft magnetic properties respectively in two printing passes. Preferably, the two sets of magnetic inks are applied as bars which are printed on plastic cardstock. The bars are interweaved in the manner shown in FIG. 2. The bars may preferably be orientated substantially perpendicular to the stripe 4, but they should have a slight inclination, for example, in the order of 1° – 10°, and preferably about 5° from the perpendicular. The printing passes are preferably made in two separate printing runs. Because the two passes occur, and the techniques of printing each pass result in a registration variation from any predetermined position of a bar in the order of 0.002 inches, due to problems of tolerance control, the possibility of creating two exactly similar sets of bars in the printing process is very remote. After the printing has occurred, the plastic cardstock is preferably laminated with a second separate sheet to obscure or hide the printing of the two sets of bars, each of a separate ink having a different property. The properties are measured in the aforementioned manner in the system and these measures are given a specific value, for example, a digital number, which is encrypted and encoded on the magnetic hidden stripe 4 on the card 1. At this point, the card may be considered to be in its latent state. Each time thereafter when the card is offered to a machine of the system, the values generated from track 4 are compared with the data extracted from the strip 2 after the stripe 2 has been magnetized to the active state. Thus the values can be compared. If the values read from the card agree, within finely defined limits, the transaction is permitted. The measurement may for example be the measurement of bar spacing from one another in the track 4, both as to the hard and soft ink bars. The circuit for measuring the spacing is designed to achieve a reading accuracy having a tolerance in the order of 0.0005 inches, thus, exceeding substantially the tolerance of possible registration due to the two passes of ink in commercial type rotary presses. Thus, on duplicating a card, the possibility of matching the measured properties is very remote and fraudulent cards will be rejected while valid cards will permit the machine to proceed with the desired transaction.

Preferably the security access medium comprises a substrate, a secure substance for said substrate, said secure substance having a first part A and a second part B, said first and second parts having a latent and an active state, said active state having of each part having a standard measurable value, the standard measurable value of each part of the medium having a measurable relationship to predetermined limits for each part and to the value of the other part, said first part and said second part being applied to said substrate such that the standard measurable value of the active state may not be predetermined as a specific standard measurable value, but is measured after application when each part is in its active state.

In particular, the preferred medium employs magnetic substances in which each part is of a different coercivity. The different coercivity has readable values when the latent state of a first level and this value is raised to a second standard level when the method of using the medium is employed.

The security access system using the medium as previously described preferably has a movable read-write head means for activation of each part by applying a signal to the magnetic stripe for initiating measurement of the standard measurable value thus causing said substrate to pass from its latent state to its active state. The read-write head circuitry may be of the type well known to those skilled in the art and measures each part of the substances. Thus, one part may be measured when the head moves in a first direction and the other part may be measured when the head moves in the opposite direction. Thereafter a comparator can compare each part to predetermined limits within the system and determine whether the card is a valid part of the system if the measurement of the values is within the limits.

Preferably the comparison is of each part's value to predetermined limits within the system and then a subsequent comparison of the values falling within the limits of a comparison of each part with the other to determine a validity value which is recorded in a store in the system. This store can be on another area of the card, or within a data processing system. The system will further include means to reject the medium if the values of each part of the substance do not fall within the predetermined limits. This may be accomplished by a signal displayed on a reading device, or by ejecting the card from the device.

The system also will proceed with a process when the substance and the derived validity values are acceptable when compared with stored information within the system.

This method of using the medium generally, and preferably, include writing on the substance with a first signal and reading what has been written when the substance is in the active state and calculating a first value, then again writing and reading and calculating a second value, comparing the first and second value with a stored limit for each value and if the values are acceptable deriving a validity value comparison with one another. The method of using the medium further includes a comparison of the validity value of a prior reading with the value derived from current reading. This comparison is made via a logic system which may vary in result from period to period.

While we have disclosed a credit card or similar document having a magnetic data track, detectable means separate from said magnetic data track for generating a value peculiar to the particular credit card bearing said detectable means for providing a measurable secure property separate from other similar cards to enable determination of the validity of the card and of the validity of information recorded on the magnetic data track, it will be understood that various modifications, alterations and improvements will occur to those skilled in the art, both now and in the future, and the invention disclosed is not limited to the preferred embodiment herein disclosed or to the disclosed method of utilizing same.

What is claimed is:

1. A credit card having a magnetic data track, detectable means separate from said magnetic data track for generating a value peculiar to the peculiar credit card bearing said detectable means for providing a measurable secure property different from other similar cards to enable determination of the validity of the card and of the validity of information recorded on the magnetic data track, said detectable means comprising a plurality of magnetic areas, at least some of which have different magnetic properties.

2. A credit card according to claim 1 wherein said magnetic areas are spaced from one another a variable distance.

3. A credit card according to claim 2 wherein one or more of the spaced magnetic areas of similar magnetic properties overlap and/or adjoin spaced magnetic areas having different magnetic properties.

4. A credit card according to claim 4 wherein a first area is applied to said substrate in a first printing pass along a predetermined track and a second areas is applied to said substrate in a second printing pass.

5. A credit card according to claim 2 wherein said areas are formed as bars aligned in a track.

6. A credit card according to claim 5 wherein said track represents a direction of reading said magnetic bars and said bars are inclined at an angle with respect to said direction of reading.

7. A credit card according to claim 2 wherein said spacing varies randomly due to printing variances.

8. A credit card according to claim 1 wherein said magnetic areas are formed as bars aligned in a track, at least some of said bars of one different coercivity being interspersed between bars of another different coercivity.

9. A credit card according to claim 8 wherein the measurement of values is a function of the magnetic properties of magnetic ink of said bars.

10. A credit card according to claim 9 wherein said measurement of values is a function of both the magnetic properties of the magnetic inks of said bars and of the relative spacing of said bars along a reading track.

11. A credit card according to claim 8 wherein the value determined by measurement of magnetic properties includes a value dependent upon a difference determined by a measurement of the spacing of a plurality of magnetic bars of a first magnetic ink and a spacing of a plurality of a second magnetic ink.

12. A credit card according to claim 1 wherein the value peculiar to the particular credit card is recorded on the credit card.

13. A credit card according to claim 12 wherein the value generated is recorded on the credit card after it is encrypted and/or encoded.

14. A credit card according to claim 13 wherein the encrypted and/or encoded value is such that the information recorded on the magnetic track is a random value.

15. A credit card according to claim 1 wherein said magnetic areas have a random amount of magnetic material due to variances in printing of the areas.

16. A credit card according to claim 1 wherein the areas are magnetic substances of a different coercivity.

17. A credit card according to claim 16 wherein the magnetic substances have a readable value when in the latent state of a first level and this readable value is raised to a second level when the substance read is in an active state.

18. A credit card according to claim 17 wherein the value of the areas is a function of said different coercivities.

19. A security access medium comprising a substrate, a secure substance for said substrate, said secure substance having a first part and a second part, said first and second part having a latent and an active state, said active state having for each part a standard measurable value, the standard measurable value of each part of the medium having a measurable relationship to predetermined limits for each part and to the value of the other part, said first part and said second part being applied to said substrate such that the standard measurable value of the active state may not be predetermined as a specific standard measurable value before activation but is measured after activation when each part is in its active state.

20. A security access medium according to claim 19 wherein the medium employs magnetic substances in which each part is of a different coercivity.

21. A security access medium according to claim 20 wherein the magnetic substances have a readable value when in the latent state of a first level and this readable value is raised to a second level when the substance read is in its active state.

22. A security access medium according to claim 21 wherein the standard measurable value of the active state is a function of said different coercivities.

23. A security access medium according to claim 19 wherein said first part is applied to said substrate in a first printing pass along a predetermined track and said second part is applied to said substrate in a second printing pass.

24. A security access medium according to claim 23 wherein said first part and said second part are a plurality of bars printed on the medium.

25. Security access medium according to claim 24 wherein said bars having an inclination with respect to said printed track between one and ten degrees.

26. Security access medium according to claim 23 wherein the printing of each part by separate passes result in registration variation from a predetermined position which variation may be measured and compared with predetermined limits.

27. A security access system using a medium according to claim 19 having means for activation of said first part and said second part of initiating measurement of said standard measurable value by causing said substrate to pass from its latent state to its active state, means to measure each part of the substance, means to compare each part to predetermined limits within said system and to compare the values determined from each part falling within the limits with each other to determine a validity value which is recorded in a store in the system.

28. The system according to claim 27 further including means to reject the medium if the values of each part of the substance do not fall within said predetermined limits.

29. A security access medium according to claim 19 wherein said parts comprises a plurality of magnetic areas at least some of which have different magnetic properties.

30. A security access medium according to claim 29 wherein said magnetic areas are spaced from one another a variable distance.

31. A security access medium according to claim 30 wherein one or more of the spaced magnetic areas of similar magnetic properties overlap and/or adjoin spaced magnetic areas having different magnetic properties.

32. A security access medium according to claim 30 wherein said spacing varies randomly due to printing variances.

33. A security access medium according to claim 29 wherein said areas are formed as bars aligned in a track.

34. A security access medium according to claim 33 wherein said track represents a direction of reading said magnetic bars and said bars are inclined at an angle with respect to said direction of reading.

35. A security access medium according to claim 29 wherein said magnetic areas have a random amount of magnetic material due to variances in printing of the areas of said parts.

36. A security access medium according to claim 19 wherein the standard measurable value of the active state is determined by measurement of the magnetic properties of a plurality of magnetic areas, at least some of which have different magnetic properties.

37. A security access medium according to claim 36 wherein said magnetic areas are a plurality of magnetic bars and the measurement of values is a function of the magnetic properties of magnetic ink of said bars.

38. A security access medium according to claim 36 wherein said measurement of the standard measurable values is a function of both the magnetic properties of the magnetic inks of said bars and of the relative spacing of said bars along a reading track.

39. A security access medium according to claim 19 wherein the standard measurable value determined by measurement of magnetic properties includes a value dependent upon a difference determined by a measurement of the spacing of a plurality of magnetic bars of a first magnetic ink and a spacing of a plurality of bars of a second magnetic ink.

40. A security access medium according to claim 19 wherein the standard measurable value of the active state peculiar to the particular credit card is recorded on the medium.

41. A security access medium according to claim 40 wherein the said standard measurable value of the active state is recorded on the medium after it is encrypted and/or encoded.

42. A security access medium according to claim 41 wherein the encrypted and/or encoded value is such that the information recorded on the medium is a random value.

* * * * *